US005428604A

United States Patent [19]
Fuda

[11] Patent Number: 5,428,604
[45] Date of Patent: Jun. 27, 1995

[54] TRAINING METHOD FOR AN ECHO CANCELLER FOR USE IN A VOICE CONFERENCE SYSTEM

[75] Inventor: Hitoshi Fuda, Tokyo, Japan

[73] Assignee: NEC Corporation, Tokyo, Japan

[21] Appl. No.: 182,941

[22] Filed: Jan. 14, 1994

Related U.S. Application Data

[63] Continuation of Ser. No. 512,670, Apr. 20, 1990, abandoned.

[30] Foreign Application Priority Data

Apr. 20, 1989 [JP] Japan .................. 1-102126

[51] Int. Cl.⁶ .................................. H04B 3/23
[52] U.S. Cl. .................. 370/32.1; 379/410
[58] Field of Search ............ 370/32.1, 62, 32, 58.1, 370/29, 68.1, 110.1, 31; 379/410, 411, 408, 203, 204, 388; 375/14, 39, 38; 434/319; 381/63-66, 71, 93, 94

[56] References Cited

U.S. PATENT DOCUMENTS

| | | | |
|---|---|---|---|
| 4,591,669 | 5/1986 | Duttweiler et al. | 370/32.1 |
| 4,645,884 | 2/1987 | Barazeche et al. | 370/32 |
| 4,677,676 | 6/1987 | Eriksson | 381/71 |
| 4,697,261 | 5/1987 | Wang et al. | 370/32.1 |
| 4,760,596 | 7/1988 | Agrawal et al. | 379/410 |
| 4,794,640 | 12/1988 | Yeh | 379/388 |
| 4,811,342 | 3/1989 | Huang | 370/32.1 |
| 4,825,448 | 4/1989 | Critchlow et al. | 375/8 |
| 4,843,621 | 6/1989 | Potratz | 370/32 |
| 4,845,746 | 7/1989 | Li | 370/32.1 |
| 4,897,831 | 1/1990 | Negi et al. | 370/29 |
| 4,912,758 | 3/1990 | Arbel | 379/388 |
| 4,987,569 | 1/1991 | Ling et al. | 379/410 |
| 4,989,236 | 1/1991 | Myllymaki | 370/32 |
| 5,005,168 | 4/1991 | Cummiskey et al. | 370/24 |
| 5,027,393 | 6/1991 | Yamamura et al. | 379/410 |
| 5,050,160 | 9/1991 | Fuda | 370/32.1 |
| 5,101,418 | 3/1992 | Critchlow et al. | 375/38 |
| 5,121,426 | 6/1992 | Baumhauer, Jr. et al. | 379/388 |

Primary Examiner—Douglas W. Olms
Assistant Examiner—Dang Ton
Attorney, Agent, or Firm—Ostrolenk, Faber, Gerb & Soffen

[57] ABSTRACT

A training signal is supplied to an echo canceller of a voice conference system and the echo canceller is trained in response to the training signal. The training signal is supplied to the canceller only at the turning on of the power supply to the voice conference system. The results of the training are held after the training is completed.

5 Claims, 2 Drawing Sheets

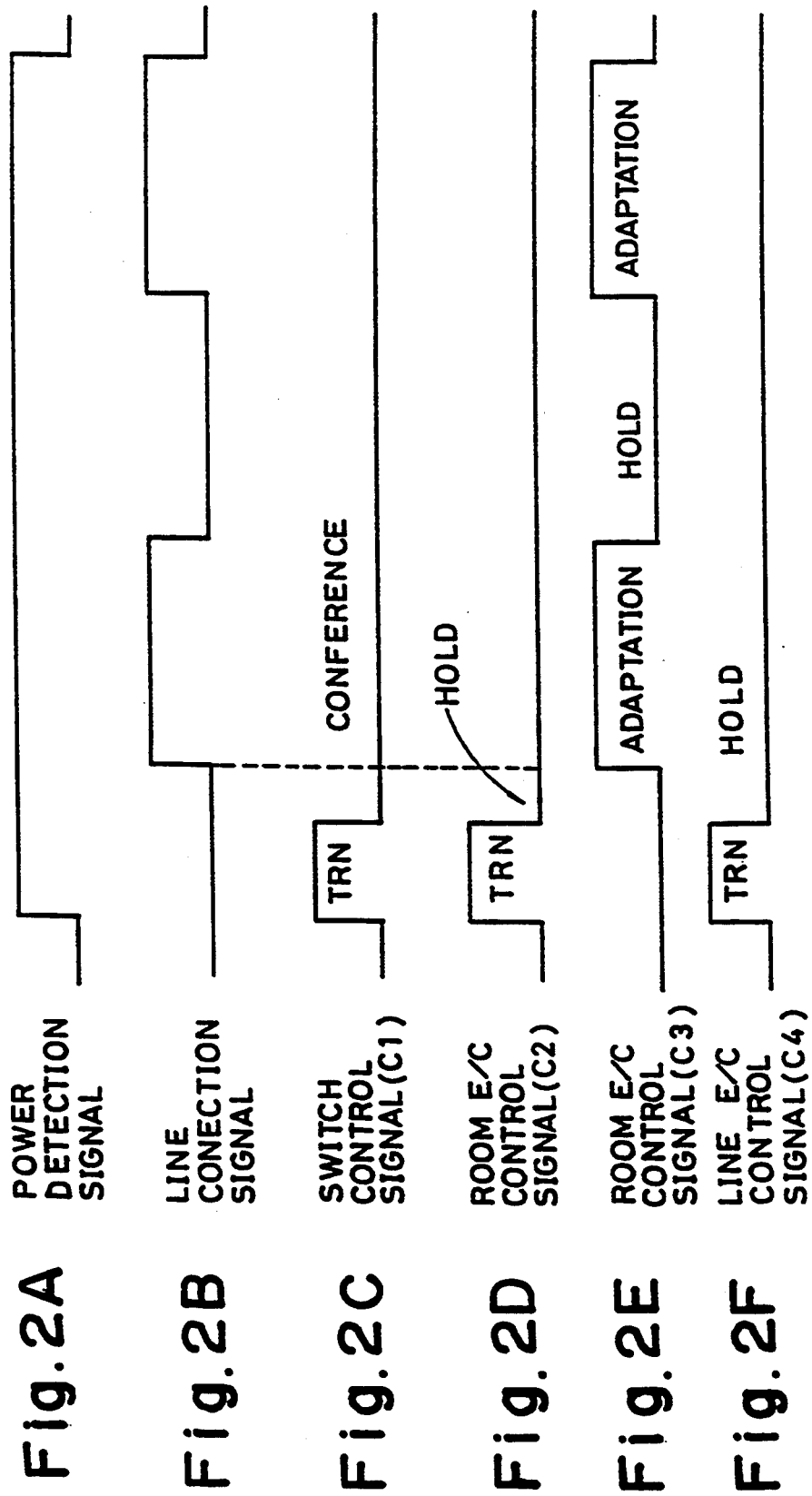

TRAINING METHOD FOR AN ECHO CANCELLER FOR USE IN A VOICE CONFERENCE SYSTEM

This is a Continuation of application Ser. No. 07/1512,670 filed on Apr. 20, 1990 now abandoned.

BACKGROUND OF THE INVENTION

The present invention relates to a training method for an echo canceller for use in a voice conference system.

Voice conference systems, which have become known in the art, are effective for holding a conference or meeting of participants or attendants living in remote locations because the participants need not be physically present in the conference or meeting. Such systems are used to connect a plurality of auditoriums by a wire, a radio, and/or a satellite communication network.

A voice conference system uses a loudspeaker as a receiver and a microphone used as a transmitter. Since the loudspeaker is unavoidably acoustically coupled to the microphone, it is inevitable that a part of the audible sound reproduced by the loudspeaker is picked up by the microphone, resulting in a reverberation signal. The reverberation signal is sent back to the remote party, and in an unfavorable case, the reverberation signal gives rise to howling.

In order to eliminate echoes in the room without intercepting the voice signal of neither the transmitting or the receiving party, it is effective to provide an echo canceller within the voice conference system. The echo canceller consists of an adaptive filter for generating a simulated echo signal according to an input voice signal, a subtractor for subtracting the simulated echo signal from the input voice signal and generating a residual echo signal, and a filter coefficient updating circuit for updating the coefficients to reduce the residual echo signal to zero. In such a conventional echo canceller for use in a voice conference system, the response characteristic of the adaptive filter in its initial state is different that of the echo path, so that the echo canceller should be trained before the conference to bring the former close to the latter. A white noise signal is usually used for the training of the canceller so that the echo cancellation can be achieved substantially uniformly within the transmission band.

Conventionally, an echo canceller for a voice conference system is trained every time the line is to be connected to the remote party, by inputting a training signal to the loudspeaker and the echo canceller before the start of the conference. This is disadvantageous in that the echo canceller should be trained every time a remote party is newly connected and reproduced noise comes out of the loudspeaker to annoy the conferees in the conference room.

SUMMARY OF THE INVENTION

An object of the present invention, therefore, is to solve the aforementioned problem and to provide a training method for an echo canceller for use in a voice conference system which does not require training every time a remote party is connected anew.

The method is applicable to a voice conference system which is equipped with a loudspeaker for reproducing speech signals, a microphone for transmitting speech signals and an echo canceller for eliminating echoes in the conference room. The training method includes the step of giving a training signal to the loudspeaker and the echo canceller only at the time of turning on the power supply to the voice conference system. The canceller is trained by the training signal, and the result of the training is held after the training is completed.

BRIEF DESCRIPTION OF THE DRAWINGS

FIGS. 2A to 2F are waveform diagrams for explaining the operation of the system shown in FIG. 1.

DETAILED DESCRIPTION OF THE PREFERRED EMBODIMENT

Figure 1:
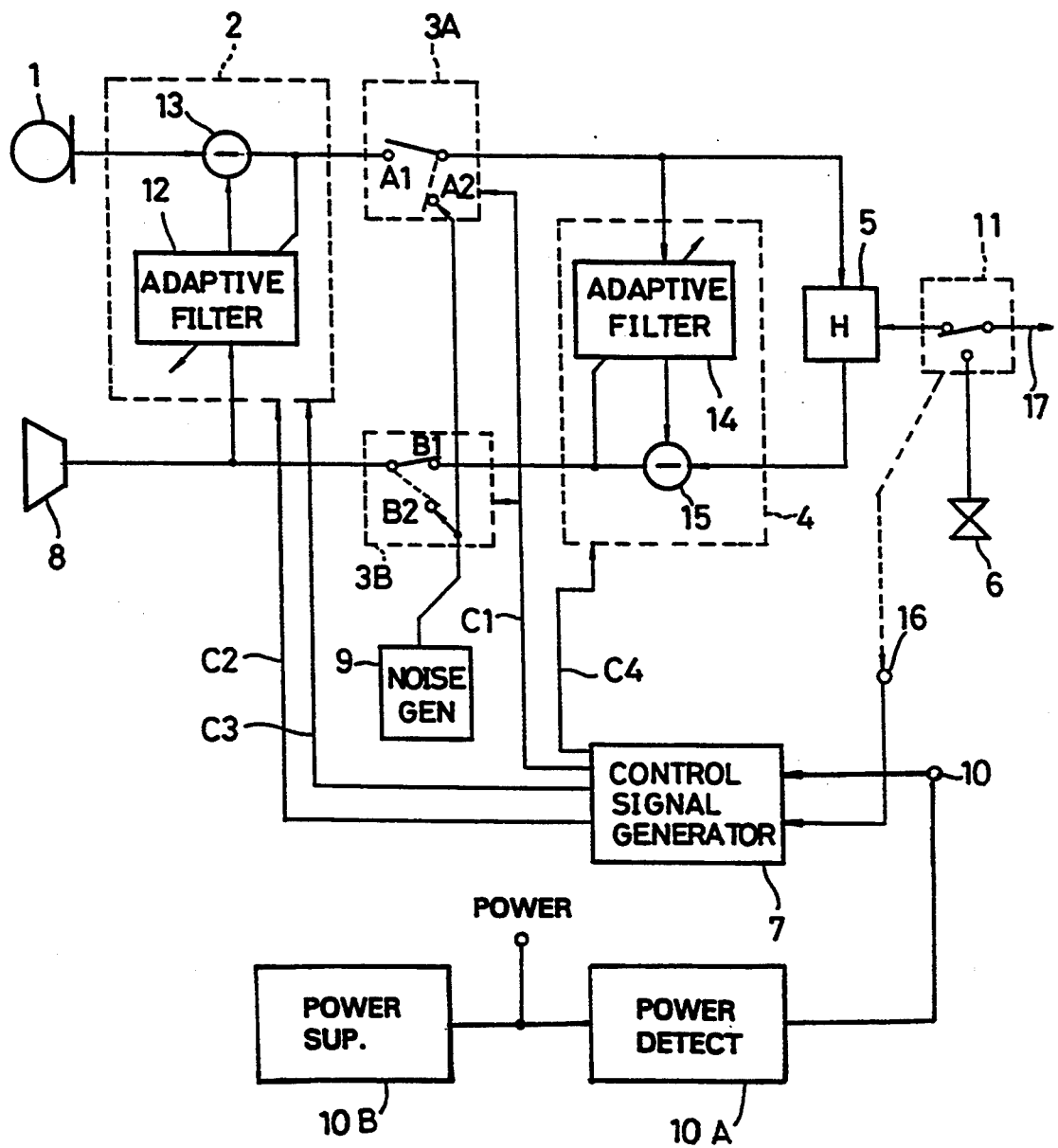
FIG. 1 is a block diagram of a voice conference system illustrating a preferred embodiment of the present invention.

Next, the present invention will be described in detail with reference to the accompanying drawings.

FIG. 1 is a block diagram of a voice conference system illustrating a preferred embodiment of the invention. In FIG. 1, a speech signal entered into a microphone 1, after passing an echo canceller 2 for eliminating echoes in the room and a switch 3A, is supplied to another echo canceller 4 and a hybrid circuit 5. The echo canceller 4 is equipped to cancel echoes due to the hybrid circuit 5. On the line side of the hybrid circuit 5 is provided a switch 11 for switching the connection between a voice conference system and a telephone set 6. A speech signal arriving from a remote party, after passing the hybrid circuit 5, the echo canceller 4 and a switch 3B, is supplied to the echo canceller 2 and a loudspeaker 8. A terminal 10 receives a power detection signal from a power detecting circuit (10A), indicating that the power supply 10B to the voice conference system has been turned on, while a terminal 16 receives a line connection signal from the switch 11, indicating that the switch 11 has selected the line 17. A control signal generator (controller) 7, as will be described below, is responsive to the power detection signal and the line connection signal from the switch 11 to generate control signals C1 to C4 for the training of the echo cancellers 2 and 4. The switches 3A and 3B select contacts A2 and B2 in response to "1", or contacts A1 and B1 in response to "0", of the control signal C1. The canceller 4 is trained in response to "1", or holds filter coefficients, which are the result of training, in response to "0" of the control signal C4. Meanwhile the canceller 2 is trained in response to "1", or holds filter coefficients, which are the result of the training, in response to "0" of the control signal C2. The canceller 2 also updates the coefficients in response to "1", or holds the update results until the end of the conference, in response to "0" of the signal C3. For these operations to update the canceller, suspend the training and hold the coefficients, there is available for use a configuration to suspend the modification of the filter coefficients of an echo canceller at the time of double talk and to hold the filter coefficients at that time. More specifically, this can be realized with a gate circuit which is responsive to a control signal to turn the signal supplied to the filter coefficient updating circuit to "0".

Next will be described the training method for an echo canceller according to the present invention with reference to FIGS. 1 and 2A to 2F.

When the power supply to the voice conference system is turned on, the control circuit 7 generates the control signals C1 to C4 (FIGS. 2C to 2F) in response to the power detection signal (FIG. 2A). As the switch 3B selects the contact B2 in response to "1" of the signal C1, a training signal (white noise) from a noise generator 9 is supplied via the contact B2, the loudspeaker 8 and the microphone 1 to the canceller 2, which is trained in response to "1" of the control signal C2. Meanwhile, as the switch 3A selects the contact A2 in response to "1" of the control signal C1, the training signal is also supplied via the contact A2 and the hybrid circuit 5 to the canceller 4. The canceller 4 is trained in response to "1" of the control signal C4. As the control signal C1 turns to "0" after the training is completed (after the lapse of a prescribed length of time), the switches 3A and 3B select the contacts A1 and B1 and, at the same time, the cancellers 2 and 4 hold the result of the training (the updated coefficients) in response to "0" of the control signals C2 and C4. Next, when connection is made to a remote party with the telephone set 6 to hold a voice conference, the switch 11 selects a line 17 and sends out the line connection signal (FIG. 2B) to the controller 7. The controller 7 generates the control signal C3 (FIG. 2E) in response to "1" (conference in session) or "0" of the line connection signal. The canceller 2 updates the echo path characteristic in response to "1" (conference in session) of the control signal C3 during the conference. This operation is the same as the cancelling operation of the conventional echo canceller. After a conference is over, the control signal C3 turns to "0", which causes the canceller 2 to hold the coefficients updated during the conference. If another conference is to be held with another remote party by turning the switch 11 again to the telephone set, the cancellers can be actuated in their trained state as shown in FIGS. 2B and 2E.

Although the present invention has been described in connection with particular embodiments thereof, many other variations and modifications and other uses will become apparent to those skilled in the art. It is preferred, therefore, that the present invention be limited not by the specific disclosure herein, but only by the appended claims.

What is claimed is:

1. A training method for an echo canceller having a microphone and a speaker comprising the steps of:
   (a) turning on a power supply to the voice conference system;
   (b) supplying a training signal to said echo canceller of said system only at said turning on of said power supply to said voice conference system;
   (c) training said echo canceller in response to said training signal;
   (d) holding results of said training as initial filter coefficients of an adaptive filter of said echo canceller after said training of said echo canceller is completed;
   (e) connecting a communication channel to a remote party to hold a voice conference with said voice conference system;
   (f) adapting said echo canceller at the start of said voice conference;
   (g) holding an adapted result of said adapting of said echo canceller upon completion of said voice conference; and
   (h) repeating said steps (e), (f) , (g).

2. A voice conference system, comprising:
   send-out signal generating means having a microphone for picking up a reproduced signal and for producing a send-out signal;
   receive-in signal reproducing means for causing a loudspeaker to reproduce a receive-in signal coming in over a communication line to thereby output the reproduced signal;
   echo canceller means for cancelling, in response to the receive-in signal, a reverberation signal caused by the microphone which picks up the reproduced signal;
   control signal generating means for generating a control signal in response to a power detection signal which is representative of the connection of a power supply to said voice conference system; and
   training signal supplying means for supplying a training signal to train said echo canceller in response to said control signal.

3. A voice conference system, comprising:
   a microphone and a loudspeaker;
   a switch for: (1) connecting the microphone and the loudspeaker to a remote party; and (2) disconnecting the remote party from the microphone and the loudspeaker;
   an echo canceller having an adaptive filter for modifying a signal outputted by the microphone as a function of a signal from the remote party such that a reverberation signal is not sent to the remote party; and
   controlling means for: (1) training the echo canceller; (2) holding a trained result of the training as initial filter coefficients of said adaptive filter of said echo canceller; (3) when the remote party is connected to the microphone and the loudspeaker, adapting the echo canceller with the initial filter coefficients; and (4) when the remote party is disconnected from the microphone and the loudspeaker, holding an adapted result of the adapting as initial filter coefficients of said adaptive filter of said echo canceller for use with another remote party to be connected, and further wherein the controlling means includes means for training the echo canceller in response to a connection of the voice conference system to a source of power.

4. The voice conference system of claim 3, wherein the controlling means includes means for holding the training result as filter coefficients of said adaptive filter of said echo canceller in response to the end of a period of time following the connection of the voice conference system to the source of power.

5. The voice conference system of claim 3, further comprising a circuit between the switch and the microphone and the loudspeaker, wherein the echo canceller includes a first echo canceller for eliminating echoes in a room and a second echo canceller for eliminating echoes in the circuit, the controlling means including means for training the first and second echo cancellers in response to the connection of the voice conference system to a source of power, the controlling means including means for adapting only the first echo canceller when the remote part is connected to the microphone and the loudspeaker.

* * * * *